United States Patent
Daly

(10) Patent No.: US 10,670,065 B2
(45) Date of Patent: Jun. 2, 2020

(54) TOGGLE FIXING

(71) Applicant: fischerwerke GmbH & Co. KG, Waldachtal (DE)

(72) Inventor: Aaron Daly, Pfalzgrafenweiler (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 246 days.

(21) Appl. No.: 16/007,708

(22) Filed: Jun. 13, 2018

(65) Prior Publication Data

US 2018/0372139 A1 Dec. 27, 2018

(30) Foreign Application Priority Data

Jun. 21, 2017 (DE) .................. 10 2017 113 639

(51) Int. Cl.
*F16B 21/00* (2006.01)
*F16B 13/08* (2006.01)

(52) U.S. Cl.
CPC ................ *F16B 13/0808* (2013.01)

(58) Field of Classification Search
CPC .................................. F16B 13/0808
USPC ........................... 411/340, 344, 999
See application file for complete search history.

(56) References Cited

U.S. PATENT DOCUMENTS

| | | | | | |
|---|---|---|---|---|---|
| 4,073,924 A | * | 2/1978 | Sonntag | ............... | C07D 233/72 514/389 |
| 4,286,497 A | * | 9/1981 | Shamah | ................. | F16B 37/04 411/342 |
| 4,439,079 A | * | 3/1984 | Losada | ............... | F16B 13/0808 24/16 PB |
| 4,570,303 A | * | 2/1986 | Richmond | ............ | F16B 21/071 24/16 PB |
| 5,926,921 A | * | 7/1999 | Benoit | ............... | B65D 63/1072 24/16 PB |

(Continued)

FOREIGN PATENT DOCUMENTS

| CA | 3 000 283 A1 | 4/2017 |
|---|---|---|
| DE | 20 2009 018 557 U1 | 4/2012 |

(Continued)

OTHER PUBLICATIONS

European Search Report for corresponding App. No. 18175678.4, dated Oct. 25, 2018.

(Continued)

*Primary Examiner* — Gary W Estremsky
(74) *Attorney, Agent, or Firm* — Renner, Otto, Boisselle & Sklar, LLP

(57) ABSTRACT

A toggle fixing for fixing an article to a thin-walled component, having a crosspiece for engaging behind the component, which crosspiece has an opening for receiving a screw. Connected to the crosspiece there is an elongated strip having a displaceable sleeve which has a screw hole for passage of the screw. The sleeve has an engagement element for threaded engagement of a screw in order that the latter does not unintentionally tilt the crosspiece during mounting. In order to provide quick insertion of a screw, the engagement element has a manipulating element such that the engagement element is movable radially outwards relative to the longitudinal axis, and the engagement element is manipulatable from a rear side of the sleeve emote from the crosspiece.

8 Claims, 2 Drawing Sheets

(56) References Cited

U.S. PATENT DOCUMENTS

| | | | | |
|---|---|---|---|---|
| 6,161,999 A * | 12/2000 | Kaye | .................. | F16B 13/0808 |
| | | | | 411/344 |
| 6,185,791 B1 * | 2/2001 | Khokhar | ............ | B65D 63/1063 |
| | | | | 24/16 PB |
| 6,821,069 B2 * | 11/2004 | Ikuta | .................. | F16B 13/0808 |
| | | | | 411/340 |
| 7,828,501 B2 * | 11/2010 | Bauer | ................. | F16B 13/0808 |
| | | | | 411/258 |
| 8,303,224 B2 * | 11/2012 | McDuff | ............... | F16B 13/003 |
| | | | | 411/341 |
| 8,499,419 B2 * | 8/2013 | Cheng | ............... | B65D 63/1063 |
| | | | | 24/16 PB |
| 8,858,143 B2 * | 10/2014 | Gaudron | ............ | F16B 13/0808 |
| | | | | 411/344 |
| 8,955,198 B2 * | 2/2015 | Carnevali | .......... | B65D 63/1063 |
| | | | | 24/16 PB |
| 2018/0258971 A1 | 9/2018 | Daly | | |

FOREIGN PATENT DOCUMENTS

| | | |
|---|---|---|
| DE | 10 2015 116 426 A | 3/2017 |
| EP | 2093362 A1 | 8/2009 |

OTHER PUBLICATIONS

Search Report for corresponding German Application No. 10 2017 113 642.8, dated Feb. 2, 2018.

* cited by examiner

TOGGLE FIXING

CROSS-REFERENCE TO RELATED APPLICATIONS

This application claims priority under 35 USC § 119 to German Patent Application No. 10 2017 113 639.8, filed on Jun. 21, 2017, the entire disclosure of which is incorporated herein by reference.

TECHNICAL FIELD

The invention relates to a toggle fixing.

BACKGROUND ART

A generic toggle fixing is known from the specification DE 10 2015 116 426 A1. The toggle fixing is used for fixing an article to a thin-walled component, for example to a plasterboard panel, as used in dry walling for producing walls and for cladding ceilings. A "thin-walled" component can, however, also be the wall of a vertically perforated brick or the wall of an item of ceramic sanitaryware, this list not being exhaustive. In the installed state, the rear side of the component is usually not accessible, but there is a cavity behind the component. If the component is, for example, a plasterboard panel and an article is to be fixed thereto, first of all a hole is drilled through the plasterboard panel and a crosspiece of the toggle fixing is introduced through the drilled hole into the cavity behind the panel. In the case of the toggle fixing known from the specification DE 10 2015 116 426 A1, the crosspiece is a substantially cylindrical component made of plastics material which is elongated along a crosspiece longitudinal axis and has in the centre a transversely extending opening with an internal thread for receiving a screw. A strip is joined integrally to the crosspiece, which strip is resiliently and/or plastically flexible. The strip is thereby pivotally connected to the crosspiece. By virtue of the pivotal connection, the crosspiece can be tilted relative to the strip so that it can be passed through a drilled hole in the thin-walled component and tilted again in the cavity behind the component and brought to rest against the rear side of the component. Attached to the strip is a sleeve which can be moved along the strip towards the crosspiece and, to fix the crosspiece in place, inserted into the drilled hole and clamped against the component. For that purpose the strip has tooth elements in which a locking element of the sleeve engages, thereby preventing backward movement of the sleeve away from the crosspiece. The sleeve comprises a collar which in an end position rests against the outer side of the component. In the end position, an article can be mounted on the component and attached with a screw to the toggle fixing and accordingly to the component.

If the screw were arranged to be simply pushed through the sleeve, an axial force on the screw could result in the crosspiece being pressed away from the inaccessible side of the thin-walled component. An axial force is particularly exerted on the screw when it is screwed in using a battery-operated screwdriver. If the screw does not directly encounter the opening having the internal thread, the force has the effect that the crosspiece may shift position in such a way that the opening is even harder to find. The specification DE 10 2015 116 426 A1 therefore proposes that the screw not be pushable through the sleeve but be screwed through the sleeve. For that purpose the sleeve especially has a resilient element for threaded engagement. As a result of the threaded engagement, axial forces are diverted from the screw via the sleeve to the thin-walled component, so that the screw does not undesirably push the crosspiece away. A resilient element has the advantage that different screw diameters can be screwed in.

A disadvantage of the known solution is that screwing-in requires more time than pushing-in.

SUMMARY

An object of the invention is therefore to provide a toggle fixing which is more user-friendly to handle.

The toggle fixing according to the invention for fixing an article to a thin-walled component, for example to a plasterboard panel, has a crosspiece for engaging behind the component, a strip which is connected to the crosspiece, and a sleeve which is arranged on the strip. The crosspiece is especially elongated along a crosspiece longitudinal axis, that is to say it can be circumscribed by a body, especially by a parallelepiped, which in one dimension, the length in the direction of the crosspiece longitudinal axis, is larger by a multiple than in the other two dimensions. The two other dimensions are the height and the width, which run orthogonally to one another and orthogonally to the crosspiece longitudinal axis. The crosspiece has an opening for receiving a screw, which opening is especially configured as a through-opening. The opening extends along an opening longitudinal axis transversely with respect to the crosspiece longitudinal axis, especially substantially orthogonally with respect to the crosspiece longitudinal axis. When, in the installed state, the crosspiece of the toggle fixing is located in an end position in a cavity behind the component, the opening longitudinal axis is oriented in the direction of the height of the crosspiece in such a way that the screw can be inserted through the component, especially through a drilled hole in the component, into the opening. The screw, for example a wood screw or a screw having a metric thread, can be secured in the opening or in a separate fixing element of the toggle fixing. In particular, the opening has an internal thread for that purpose. The strip connected to the crosspiece serves for holding and positioning the crosspiece during mounting, there especially being just one strip connected to the crosspiece. The strip is especially elongated, especially made of plastics material and especially has tooth elements. The strip is especially inherently resistant to bending, but movably attached to the crosspiece. In particular, for insertion into a drilled hole the crosspiece can be tilted relative to the strip. The sleeve has a through-opening for passage of the strip, the cross-section of which opening is complementary to the cross-section of the strip and especially corresponds to the cross-section of the strip. The through-opening can be connected to a screw hole to be described hereinbelow or can be entirely separate therefrom. The through-opening can also be partly open towards the periphery of the sleeve. The sleeve has especially at least one locking element for engagement in the tooth elements which are arranged on the strip. The sleeve has a screw hole for passage of the screw, the screw hole extending along a longitudinal axis which especially corresponds to the sleeve longitudinal axis. The screw hole is especially closed over its periphery, but may also be partly open towards the through-opening and/or towards the periphery of the sleeve. The sleeve has an engagement element for threaded engagement of the screw. The engagement element projects radially into the screw hole, with "radially" referring to the longitudinal axis of the screw hole. The engagement element need not necessarily be arranged within the longitudinal extent of the screw hole in order to effect threaded engagement, but can also be arranged offset in the longitudinal direction, which is still to be understood herein as "projecting radially into the screw hole".

It is characteristic of the toggle fixing according to the invention that the engagement element has a manipulating element such that it is movable radially outwards relative to the longitudinal axis of the sleeve. According to the invention the engagement element with the manipulating element is configured so that such movement is effected from a rear side of the sleeve remote from the crosspiece, that is to say the engagement element is manipulatable from the accessible rear side facing the user. This enables a screw to be pushed through the screw hole while the engagement element is moved radially to the side by means of the manipulating element, this being referred to as "deactivation" hereinbelow. Once the screw has been inserted in such a way that the front end in the introduction direction abuts the crosspiece, the engagement element can especially be moved radially inwards again or moves independently in that direction in such a way that the thread of the screw is engaged. This is referred to hereinbelow as "activation". When the screw is screwed in, axial forces can then in turn be transmitted from the screw via the engagement element into the sleeve and from the latter into the thin-walled component. As mentioned, the deactivation allows the screw to be pushed in, which is considerably quicker than rotational insertion.

In a preferred embodiment, the engagement element is pivotally connected to a main body of the sleeve, with "pivotally" here not being meant narrowly in the sense of a physically exactly defined pivot axis, but, for example, also including the movement of a flexible bar, with a pivot axis approximately in the region of attachment of the flexible bar. The pivot axis is preferably arranged at the end of the engagement element opposite the rear side of the sleeve. In other words, the pivot axis is located to the front of the engagement element, the terms "front" and "rear" here always referring to the introduction direction of the screw. In comparison with the reverse arrangement as known from DE 10 2015 116 426 A1, this has the advantage that the screw is supported significantly more rigidly by the engagement element and, in particular, the engagement element does not yield radially outwards when axial forces are exerted on the screw.

Preferably the engagement element is resiliently connected to a main body of the sleeve. As compared with the toggle fixing known from the specification DE 10 2015 116 426 A1, this not only makes it possible to adapt to different screw diameters, but especially enables automatic resetting to take place radially inwards for activation after a deactivation.

In a preferred embodiment, the engagement element is in the form of an angular resilient arm. A first limb of the resilient arm has a projection which projects radially inwards relative to the longitudinal axis, which projection serves for engagement of the screw. The second limb forms the manipulating element. This does not mean that, in particular, further elements for forming the manipulating element cannot be arranged on the limb. Preferably the first limb extends substantially parallel to the longitudinal axis of the sleeve and the second limb extends perpendicularly or at an angle to the longitudinal axis. This has the result that the first limb can be arranged compactly in the interior of the sleeve and the second limb can be arranged accessibly on the rear side. By virtue of an angled arrangement of the second limb, the latter can project slightly rearwards with respect to the main body of the sleeve and, to manipulate the engagement element, can simply be pressed towards the front, that is to say towards the thin-walled component. Such activation can take place, for example, directly with a finger or as a result of the pressure of an article being fixed. For deactivation the pressure is then released again. Insofar as the article is finally pressed against the sleeve and therefore against the second limb during further tightening of the screw, this is not disadvantageous because at that time the engagement of the screw in the region of the sleeve is no longer an important factor.

In order that axial forces of the screw on the sleeve are supported in the best possible way, the invention proposes that the engagement element have a support surface for the screw facing towards the rear side of the sleeve. The support surface extends substantially perpendicularly to the longitudinal axis.

Preferably the engagement element has, towards the other side, that is to say facing away from the rear side of the sleeve, a sloping surface which extends at an angle to the longitudinal axis. This has the result that the screw can be pulled out of the sleeve with a defined force, because the sloping surface allows yielding, especially in the case of a resilient connection of the engagement element to the main body of the sleeve. This is important because although the screw is intended to find temporary purchase in the sleeve, for example in the case of overhead mounting, the actual hold is obtained by screwing into the crosspiece. Defective mounting in which the screw has not been screwed into the crosspiece will accordingly be apparent because the screw, on being subjected to a defined tensile force significantly below an intended load, is pulled out of the sleeve.

The toggle fixing is preferably assigned a screw having a machine thread, that is to say the toggle fixing is combined with a screw having an external thread complementary to the opening and/or a fixing element of the toggle fixing in which or on which the screw is securable. A "machine thread" is to be understood herein as being especially a metric thread or an inch thread (for example a Whitworth thread or American Standard Unified Screw Thread).

BRIEF DESCRIPTION OF THE DRAWINGS

The invention is explained in greater detail below with reference to an exemplary embodiment.

DETAILED DESCRIPTION

Figure 1:
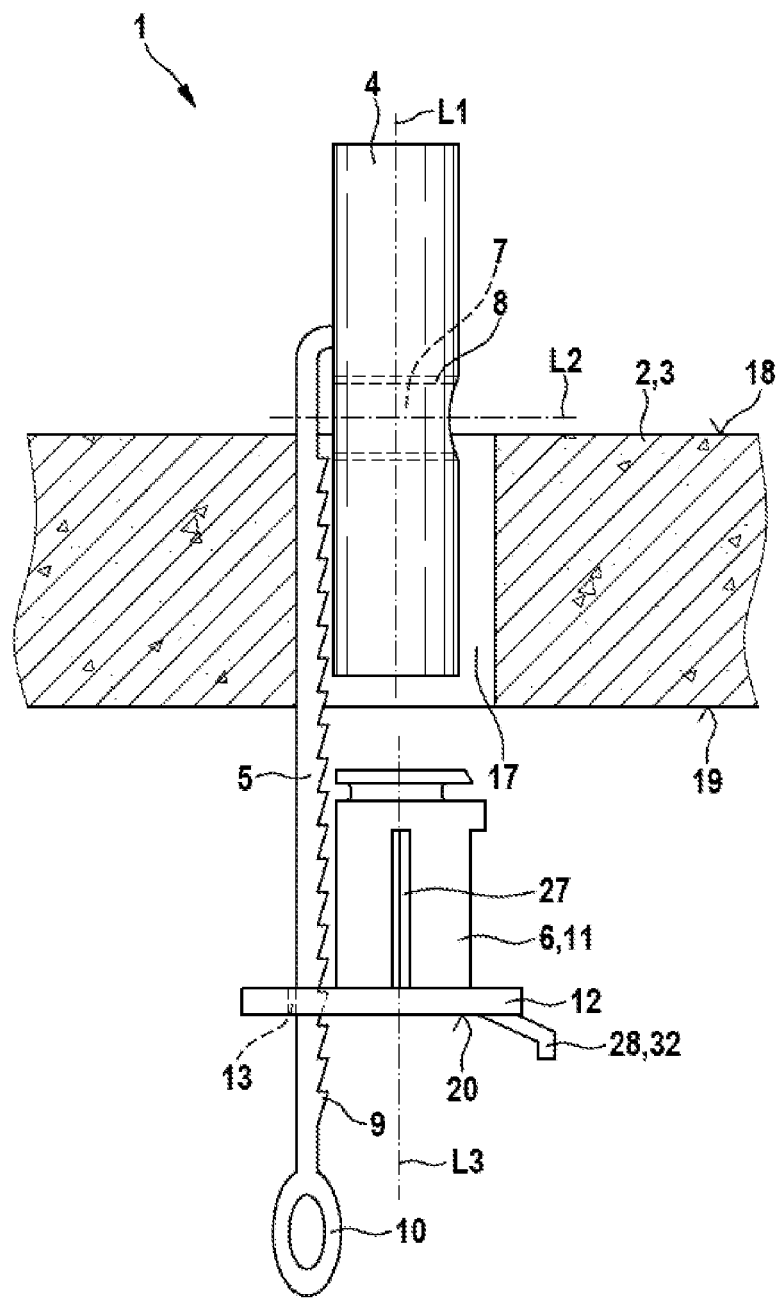
FIG. 1 is a simplified side view, partly in section, of a toggle fixing according to the invention with a sleeve in a mounting position.

The toggle fixing 1 according to the invention shown in the Figures for fixing an article (not shown) to a thin-walled component 2, in this case a plasterboard panel 3, has a substantially cylindrical crosspiece 4 made of plastics material, a strip 5 which is integrally connected to the crosspiece 4, and a sleeve 6 made of plastics material which is arranged on the strip 5.

The crosspiece 4 serves for engaging behind the plasterboard panel 3. It extends along a crosspiece longitudinal axis L1 and has in the centre an opening 7 having an internal thread 8. The opening 7 extends along an opening longitudinal axis L2 which runs perpendicularly to the crosspiece longitudinal axis L1. In other words, the opening 7 passes transversely through the crosspiece 4. The strip 5 is attached to the crosspiece 4 next to the opening 7 and in the relaxed state (not shown) extends parallel to the opening longitudinal axis L2, that is to say perpendicular to the crosspiece longitudinal axis L1. The strip 5 is resiliently deformable, with the result that the crosspiece 4 is pivotable relative to the strip 5. Since the strip 5 extends as far as the crosspiece 4, strictly speaking the crosspiece 4 is not pivotable relative to the strip 5 as a whole, but only relative to the main extent thereof. On a side facing towards the opening 7 the strip 5 has tooth elements 9 which are arranged one behind the other along the longitudinal extent of the strip 5. At its end remote from the crosspiece 4 the strip 5 has a grip element 10. The sleeve 6 has a cylindrical main body 11 with a peripherally projecting collar 12 on the side of the sleeve 6 remote from the crosspiece 4. That side is referred to hereinbelow as the "rear" and the opposite side, facing towards the crosspiece 4, as the "front". The sleeve 6 extends from the rear to the front along a longitudinal axis L3. A through-opening 13 for the strip 5 passes through the collar 12 parallel to the longitudinal axis L3. In front of the through-opening 13, a locking element 14 in the form of a resilient tongue 15 having a lug 16 (see FIGS. 2 and 3) projects from the main body 11. The strip 5 is guided past the locking element 14 through the through-opening 13, so that the locking element 14 engages the tooth elements 9. The tooth elements 9 and the locking element 14 are constructed so that the sleeve 6 can be pushed towards the front relative to the strip 5, but not towards the rear again. Should displacement towards the rear be necessary for the purpose of correcting the mounting, the tooth elements 9 and the locking element 14 can be disengaged by tilting the sleeve 6 (not shown), but this is not material to the invention.

To produce a fixing arrangement with the toggle fixing 1, first of all a hole 17 is drilled in the plasterboard panel 3. The toggle fixing 1 is then inserted into the drilled hole 17, with the crosspiece 4 to the front, as shown in FIG. 1. For that purpose the crosspiece 4 is pivoted relative to the strip 5. As soon as the crosspiece 4 has passed fully through the drilled hole 17, the elasticity of the strip 5 causes the crosspiece to pivot back into its starting position, that is to say it is perpendicular to the strip 5 again (not shown). Using the strip 5, the crosspiece 4 is pulled against the inaccessible rear side 18 of the plasterboard panel 3, and the sleeve 6 is pushed along the strip 5 towards the front into the drilled hole 17 until the collar 12 rests on a front side 19 of the plasterboard panel 3 (not shown). During that operation the strip 5 serves for holding and positioning the crosspiece 4. The protruding end of the strip 5 can then be cut off or broken off and the article being fixed mounted on the collar 12 which forms a rear side 20 of the sleeve 6 (not shown). The actual fixing of the article is carried out using a screw 21, which will be described in greater detail below in connection with the description of FIGS. 2 and 3. The screw 21 is passed through a receiving hole or the like in the article and through the sleeve 6 as far as the crosspiece 4 and is screwed into the internal thread 8 of the opening 7 in the crosspiece 4.

Figure 2:
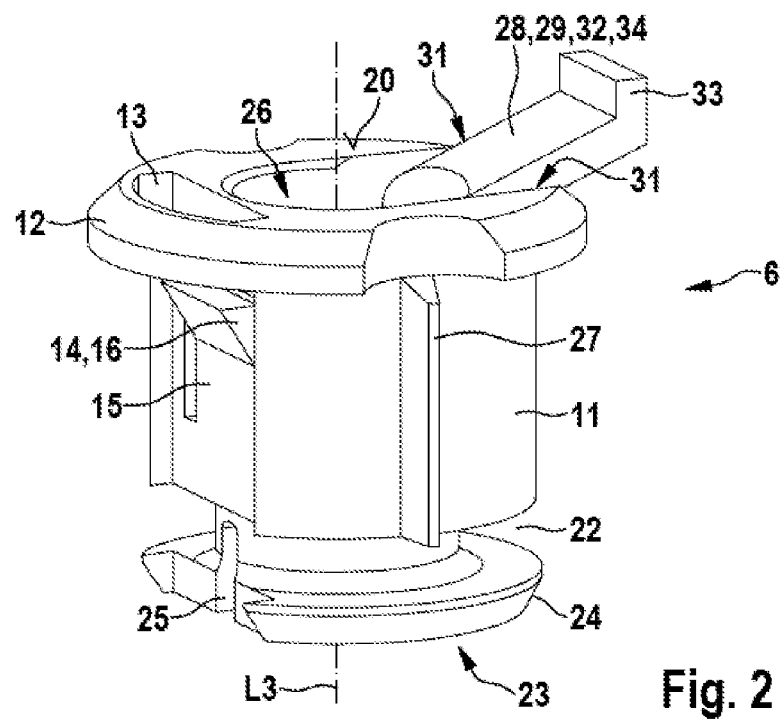
FIG. 2 is a perspective view of the sleeve of the toggle fixing according to the invention.
Figure 3:
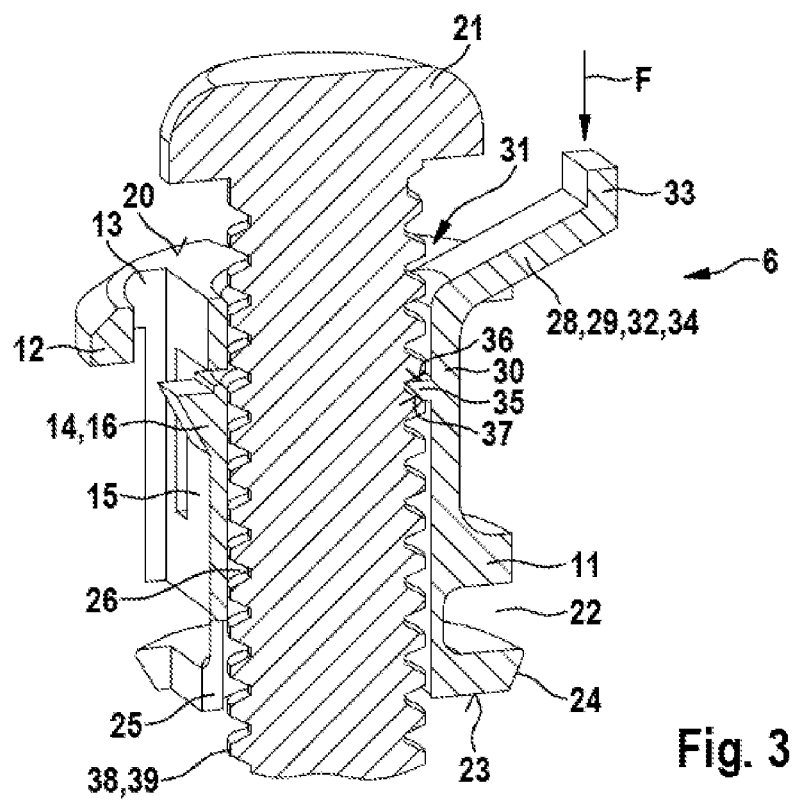
FIG. 3 is a perspective sectional view of the sleeve of the toggle fixing according to the invention with a screw.

The sleeve 6 is shown in greater detail in FIGS. 2 and 3. In the front portion, above a peripheral groove 22 there are provided an insertion end 23 with a peripheral conical bevel 24 and a slot 25 running parallel to the longitudinal axis L3. The bevel 24 serves for easier insertion of the sleeve into the drilled hole 17. The slot 25 also has the effect that the sleeve 6 can be compressed slightly radially, that is to say perpendicularly to the longitudinal axis L3, which again facilitates insertion, especially in the case of a narrow drilled hole 17.

A screw hole 26 passes centrally through the sleeve 6 parallel to the longitudinal axis L3. On the outer periphery of the main body 11 there are also arranged, opposite one another, two radially projecting ribs 27 running parallel to the longitudinal axis L3. The ribs 27 engage in the plasterboard panel 3 in the region of the drilled hole 17 and thereby prevent unintentional twisting of the sleeve 6 relative to the plasterboard panel 3. An engagement element 28 is arranged radially opposite the resilient tongue 15. The engagement element 28 is formed by an angular resilient arm 29 which is integrally attached to the main body 11, approximately centrally in the longitudinal direction, by a first limb 30 and in the rearward direction is separated from the main body 11 by two longitudinal slots 31. The first limb 30 extends parallel to the longitudinal axis L3 as far as the collar 12 and from there merges into a second limb 32 which projects obliquely outwards and rearwards and encloses an angle of about 130 degrees with the first limb 30. At the rear end of the second limb 32 there is arranged a short extension piece 33, again running parallel to the longitudinal axis L3. The second limb 32, with its short extension piece 33, forms a manipulating element 34 of the engagement element 28. By virtue of the elasticity of the plastics material, the region where the resilient arm 29 is attached to the main body forms a pivot axis A which is arranged perpendicularly to the longitudinal axis L3. Arranged approximately centrally on the first limb 32 in the longitudinal direction there is a projection 35 (see FIG. 3) with which the engagement element 28 projects radially inwards into the screw hole 26. The projection 35 is lug-like in longitudinal section and at the rear forms a support surface 36 perpendicular to the longitudinal axis L3 and at the front forms a sloping surface 37 which is inclined at an angle to the longitudinal axis L3.

The screw 21 has a machine thread 38 in the form of a metric thread 39 and during the above-described production of a fixing arrangement is inserted, with its front end opposite the head (not shown) first, into the sleeve 6 from the rear until it rests on the support surface 36. Starting from that position, by rotation it can be screwed through the screw hole 26 as far as the crosspiece 4. If the machine screw 38 does not immediately engage in the internal thread 8 of the crosspiece 4, further rotation of the screw 21, instead of lifting the crosspiece 4 away from the rear side 18 of the plasterboard panel 3, causes the engagement element 28 to yield radially as a result of the sloping surface 37, the engagement element 28 pivoting resiliently about the pivot axis A in opposition to the resilient force of the resilient arm 29 and, after a turn of the screw 21, pivoting back into the starting position shown in FIG. 3 again. If mounting is erroneously terminated in that state, the screw can be pulled out of the sleeve 6 with a relatively low force, significantly below the intended working load, the engagement element 28 automatically yielding radially as described above. This alerts the user to the faulty mounting. As soon as the screw 21 has encountered the internal thread 8, however, it can be screwed into the thread as already described.

A large number of turns are necessary in order for the screw 21 to be screwed in from its being in contact with the support surface 36 to its being in contact with the crosspiece 4. By pressure on the extension piece 33 of the second limb 32 parallel to the longitudinal axis L3 in deactivation direction F, the engagement element 28 is pivoted about the pivot axis A, with the result that it is movable radially outwards. Manipulation by the user is effected from the rear side 20 of the sleeve 6. The engagement element 28 is thereby deactivated, this being effected in opposition to the resilient force of resilient arm 29. As a result of the deactivation, an inside width of the screw hole 26 becomes larger so that the screw 21 can be pushed in, without rotation, until it makes contact with the crosspiece 4. This considerably shortens the mounting time and provides for user-friendly handling.

The pressure on the extension piece 33 either can be applied directly, for example with the user's finger, or the user presses the article being fixed against the rear side 20 and accordingly against the second limb 32. By virtue of the resilient force of the resilient arm 29, releasing the pressure results in resetting and accordingly activation of the engagement element 28.

LIST OF REFERENCE SYMBOLS

1 toggle fixing
2 thin-walled component
3 plasterboard panel
4 crosspiece
5 strip
6 sleeve
7 opening
8 internal thread
9 tooth elements
10 grip element
11 main body of the sleeve 6
12 collar of the sleeve 6
13 through-opening
14 locking element
15 resilient tongue
16 lug
17 drilled hole in the plasterboard panel 3
18 rear side of the plasterboard panel 3
19 front side of the plasterboard panel 3
20 rear side of the sleeve 6
21 screw
22 groove
23 insertion end of the sleeve 6
24 bevel
25 slot
26 screw hole
27 rib
28 engagement element
29 resilient arm
30 first limb
31 longitudinal slot
32 second limb
33 extension piece
34 manipulating element
35 projection
36 support surface
37 sloping surface
38 machine thread
39 metric thread
A pivot axis
F deactivation direction
L1 crosspiece longitudinal axis
L2 opening longitudinal axis
L3 longitudinal axis of the sleeve 6

The invention claimed is:

1. A toggle fixing for fixing an article to a thin-walled component, comprising:
a crosspiece for engaging behind the component, which crosspiece extends along a crosspiece longitudinal axis and has an opening for receiving a screw, the opening extending along an opening longitudinal axis transversely with respect to the crosspiece longitudinal axis,
an elongated strip, which is connected to the crosspiece and serves for holding and positioning the crosspiece during mounting and which has tooth elements, and
a sleeve, which has a through-opening for passage of the strip and has at least one locking element for engagement in the tooth elements,
wherein the sleeve has a screw hole, which extends along a longitudinal axis, for passage of the screw, the sleeve having an engagement element which projects into the screw hole radially with respect to the longitudinal axis for threaded engagement of the screw, and
the engagement element has a manipulating element such that the engagement element is movable radially outwards relative to the longitudinal axis, and the engagement element is manipulatable from a rear side of the sleeve remote from the crosspiece.

2. The toggle fixing according to claim 1, wherein the engagement element is pivotally connected to a main body of the sleeve, and the pivot axis is arranged at the end of the engagement element opposite the rear side of the sleeve.

3. The toggle fixing according to claim 1, wherein the engagement element is resiliently connected to a main body of the sleeve.

4. The toggle fixing according to claim 3, wherein the engagement element is in the form of an angular resilient arm, wherein a first limb of the resilient arm has a projection which projects radially inwards relative to the longitudinal axis, and a second limb forms the manipulating element.

5. The toggle fixing according to claim 4, wherein the first resilient arm extends substantially parallel to the longitudinal axis and the second resilient arm extends perpendicularly or at an angle to the longitudinal axis.

6. The toggle fixing according to claim 1, wherein the engagement element has a support surface facing towards the rear side of the sleeve, which support surface extends substantially perpendicularly to the longitudinal axis.

7. The toggle fixing according to claim 1, wherein the engagement element has a sloping surface facing away from the rear side of the sleeve, which sloping surface extends at an angle to the longitudinal axis.

8. The toggle fixing according to claim 1 wherein the toggle fixing is assigned a screw having a machine thread.

* * * * *